(12) United States Patent
Knipe

(10) Patent No.: US 6,552,840 B2
(45) Date of Patent: Apr. 22, 2003

(54) ELECTROSTATIC EFFICIENCY OF MICROMECHANICAL DEVICES

(75) Inventor: Richard L. Knipe, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/726,861

(22) Filed: Nov. 30, 2000

(65) Prior Publication Data

US 2002/0093721 A1 Jul. 18, 2002

Related U.S. Application Data

(60) Provisional application No. 60/168,968, filed on Dec. 3, 1999.

(51) Int. Cl.[7] .............................................. G02B 26/00
(52) U.S. Cl. ........................ 359/291; 359/292; 359/295; 359/223; 359/224
(58) Field of Search ............................... 359/290, 291, 359/292, 214, 213, 221, 224, 295, 223, 226, 298

(56) References Cited

U.S. PATENT DOCUMENTS

| | | | |
|---|---|---|---|
| 5,061,049 A | 10/1991 | Hornbeck | 359/224 |
| 5,212,582 A * | 3/1992 | Nelson | 359/224 |
| 5,583,688 A | 12/1996 | Hornbeck | 359/291 |
| 5,771,116 A * | 6/1998 | Miller et al. | 359/295 |
| 5,867,202 A | 2/1999 | Knipe et al. | 347/239 |
| 6,147,790 A | 11/2000 | Meier et al. | 359/291 |

* cited by examiner

Primary Examiner—Georgia Epps
Assistant Examiner—Tuyen Tra
(74) Attorney, Agent, or Firm—Charles A. Brill; Wade James Brady, III; Frederick J. Telecky, Jr.

(57) ABSTRACT

An improved micromechanical device, particularly a micromirror device having improved electrostatic efficiency. A deflectable member comprised of a mirror 302 and an active hinge yoke 306 is suspended address 308 and landing electrodes 312 on a substrate 310 and above upper address electrodes supported above the substrate 310. The deflectable member is operable to rotate about a torsion hinge axis in response to an electrostatic force between the address electrodes and the deflectable member. The upper address electrodes have a stair stepped shape to narrow a gap between the deflectable member and the upper address electeodes. The gap is narrower near the axis of rotation 810 compared to away from the axis. The stair stepped shape is achieved by embedding a portion of an oxide layer 804 between a thin metal layer 806 making up the upper address electrodes 806, the active hinge yoke 306, and the torsion hinges, and a thick metal layer 808 making up the upper address electrodes 806 and the active hinge yoke 306.

17 Claims, 4 Drawing Sheets

ELECTROSTATIC EFFICIENCY OF MICROMECHANICAL DEVICES

CROSS-REFERENCE TO RELATED APPLICATIONS

This application claims priority under 35 USC §119(e)(1) of provisional application No. 60/168,968 filed Dec. 3, 1999.

The following patents and/or commonly assigned patent applications are hereby incorporated herein by reference:

| Patent No. | Filing Date | Issue Date | Title |
|---|---|---|---|
| 5,061,049 | Sept. 13, 1990 | Oct. 29, 1991 | Spatial Light Modulator and Method |
| 5,583,688 | Dec. 21, 1993 | Dec. 10, 1996 | Multi-Level Digital Micromirror Device |
| 6,147,790 | May 13, 1999 | Nov. 14, 2000 | Spring-Ring Micromechanical Device |

FIELD OF THE INVENTION

This invention relates to the field of micromechanical systems, particularly to electrostatically deflectable micromechanical systems, more particularly to electrostatically deflectable micromirror devices.

BACKGROUND OF THE INVENTION

Micromechanical devices are small structures typically fabricated on a semiconductor wafer using techniques such as optical lithography, doping, metal sputtering, oxide deposition, and plasma etching which have been developed for the fabrication of integrated circuits.

Digital micromirror devices (DMDs), sometimes referred to as deformable micromirror devices, are a type of micromechanical device. Other types of micromechanical devices include accelerometers, pressure and flow sensors, gears and motors. While some micromechanical devices, such as pressure sensors, flow sensors, and DMDs have found commercial success, other types have not yet been commercially viable.

Digital micromirror devices are primarily used in optical display systems. In display systems, the DMD is a light modulator that uses digital image data to modulate a beam of light by selectively reflecting portions of the beam of light to a display screen. While analog modes of operation are possible, DMDs typically operate in a digital bistable mode of operation and as such are the core of the first true digital full-color image projection systems.

Micromirrors have evolved rapidly over the past ten to fifteen years. Early devices used a deformable reflective membrane which, when electrostatically attracted to an underlying address electrode, dimpled toward the address electrode. Schlieren optics illuminate the membrane and create an image from the light scattered by the dimpled portions of the membrane. Schlieren systems enabled the membrane devices to form images, but the images formed were very dim and had low contrast ratios, making them unsuitable for most image display applications.

Later micromirror devices used flaps or diving board-shaped cantilever beams of silicon or aluminum, coupled with dark-field optics to create images having improved contrast ratios. Flap and cantilever beam devices typically used a single metal layer to form the top reflective layer of the device. This single metal layer tended to deform over a large region, however, which scattered light impinging on the deformed portion. Torsion beam devices use a thin metal layer to form a torsion beam, which is referred to as a hinge, and a thicker metal layer to form a rigid member, or beam, typically having a mirror-like surface: concentrating the deformation on a relatively small portion of the DMD surface. The rigid mirror remains flat while the hinges deform, minimizing the amount of light scattered by the device and improving the contrast ratio of the device.

Recent micromirror configurations, called hidden-hinge designs, further improve the image contrast ratio by fabricating the mirror on a pedestal above the torsion beams. The elevated mirror covers the torsion beams, torsion beam supports, and a rigid yoke connecting the torsion beams and mirror support, further improving the contrast ratio of images produced by the device. Yet another recent architecture, the spring-ring micromirror device, promises improved operating performance. The spring-ring architecture and other recent architectures have enabled micromirror cells to shrink from a 16 μm mirror on 17 μm centers to smaller and smaller dimensions. As the micromirror cells shrink, it becomes much more difficult to reliably control the micromirror over the range of device variances encountered in production and over the lifetime of the device. What is needed is an improvement to the electrostatic efficiency of the basic electrostatic deflection mechanisms of digital micromirrors and other micromechanical devices.

SUMMARY OF THE INVENTION

Objects and advantages will be obvious, and will in part appear hereinafter and will be accomplished by the present invention which provides a method and system for improved electrostatic efficiency of micromirror and other micromechanical devices. One embodiment of the claimed invention provides a micromechanical device having improved electrostatic efficiency. The device comprises a first member forming one half of an air-gap capacitor, and a second member forming one half of an air gap capacitor. The second member is spaced apart from the first member by an air gap and shaped such that the air gap is smaller in a first region than in a second region.

A second embodiment of the disclosed invention provides a micromirror device. The micromirror devices comprises: a substrate, an address electrode supported by the substrate, a deflectable member supported by the substrate and spaced apart from the address electrode by a gap. The deflectable member is operable to rotate around a hinge axis. The gap between the address electrode and the deflectable member is narrower over a first region near the hinge axis and wider over a second region farther from the hinge axis. The variance in the width of the gap can be formed by using a beveled or stair stepped electrode. According to one embodiment, the stair stepped electrode is formed by encapsulating an oxide layer between two metal layers making up the electrode.

According to yet another embodiment of the disclosed invention, an image projection system is provided. The image projection system comprises: a light source for providing a beam of light along a first path, micromirror device on the first path, and a controller for providing image data to the micromirror device.

The micromirror device comprises: a substrate, an address electrode supported by the substrate; and a deflectable member supported by the substrate and spaced apart from the address electrode by a gap. The deflectable member rotates around a hinge axis to deflect into the gap. The gap is narrower over a first region close to the hinge axis and wider over a second region farther from the hinge axis.

Image data from the controller directs the micromirror device to rotate the deflectable member to either a first position wherein light incident the deflectable member is directed along a second path to an image plane, or to rotate the deflectable member to a second position wherein light incident the deflectable member is directed along a third path away from the image plane.

The disclosed micromirror device has increased efficiency since the narrowed gap provides a stronger electrostatic attractive force between the address electrode and the deflectable member when the deflectable member is in an undeflected state, while avoiding contact between the address electrode and the deflectable member when the deflectable member is in a deflected state. Contact between the two could destroy the device and would limit the deflection angle leading to an image with reduced contrast.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF THE PREFERRED EMBODIMENTS

A new design feature has been developed to improve the electrostatic efficiency of micromechanical devices including micromirror devices. The new feature is a stepped or beveled member that decreases the distance between a stationary member and a deflecting member. By decreasing the distance between the two members, a stronger electrostatic attraction is generated as a given voltage. The feature is stepped to maintain the distance between the members at a distance from the axis of rotation. Maintaining the distance between the members at a distance from the axis of rotation ensures the stepped or beveled member does not reduce the range of motion of the deflectable element.

Figure 1:
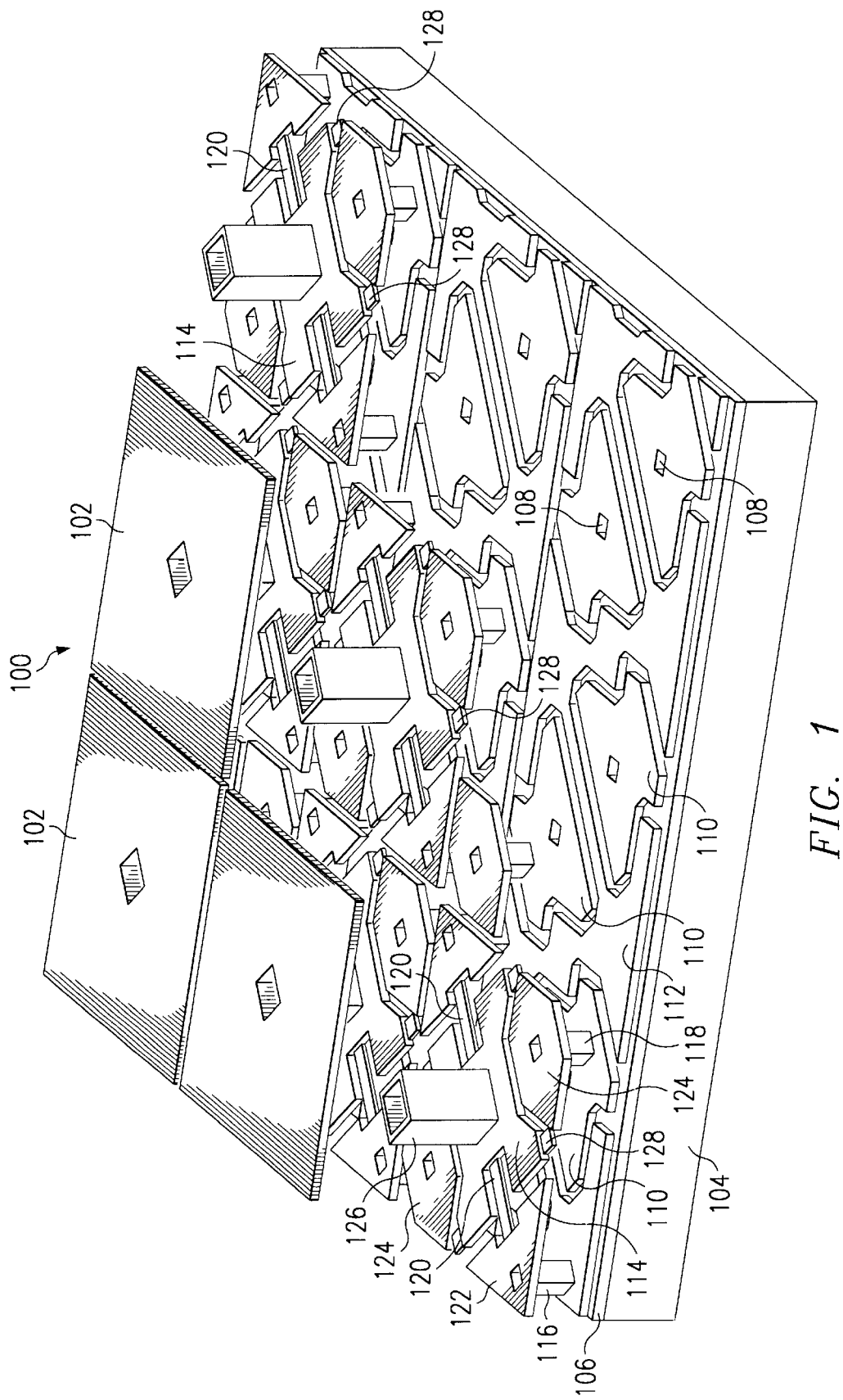
FIG. 1 is a perspective view of a small portion of a micromirror array of the prior art.
Figure 2:
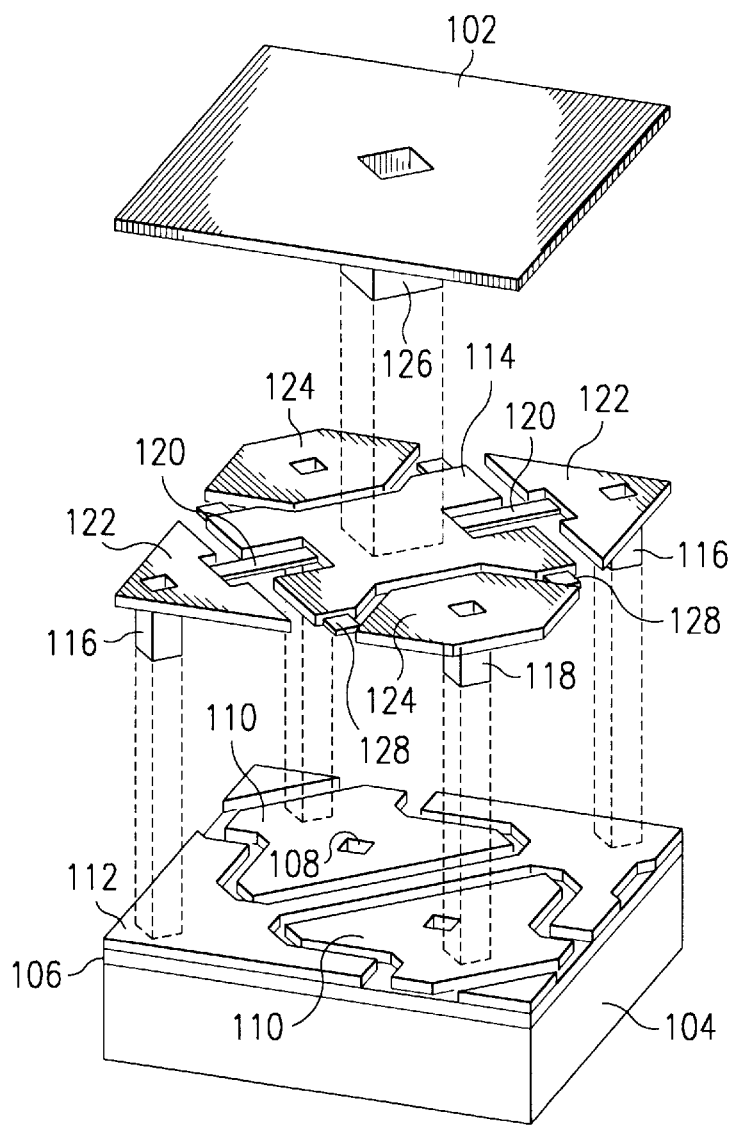
FIG. 2 is an exploded perspective view of a single micromirror element from the micromirror array of FIG. 1.

A typical hidden-hinge DMD 100 is actually an orthogonal array of DMD cells, or elements. This array often includes more than a thousand DMD rows and columns of DMDs. FIG. 1 shows a small portion of a DMD array of the prior art with several mirrors 102 removed to show the underlying mechanical structure of the DMD array. FIG. 2 is an exploded view of a single DMD element of the prior art further detailing the relationships between the DMD structures.

A DMD is fabricated on a semiconductor, typically silicon, substrate 104. Electrical control circuitry is typically fabricated in or on the surface of the semiconductor substrate 104 using standard integrated circuit process flows. This circuitry typically includes, but is not limited to, a memory cell associated with, and typically underlying, each mirror 102 and digital logic circuits to control the transfer of the digital image data to the underlying memory cells. Voltage driver circuits to drive bias and reset signals to the mirror superstructure may also be fabricated on the DMD substrate, or may be external to the DMD. Image processing and formatting logic is also formed in the substrate 104 of some designs. For the purposes of this disclosure, addressing circuitry is considered to include any circuitry, including direct voltage connections and shared memory cells, used to control the direction of rotation of a DMD mirror.

Some DMD configurations use a split reset configuration which allows several DMD elements to share one memory cell—thus reducing the number of memory cells necessary to operate a very large array, and making more room available for voltage driver and image processing circuitry on the DMD integrated circuit. Split reset is enabled by the bistable operation of a DMD, which allows the contents of the underlying memory to change without affecting the position of the mirror 102 when the mirror has a bias voltage applied.

The silicon substrate 104 and any necessary metal interconnection layers are isolated from the DMD superstructure by an insulating layer 106 which is typically a deposited silicon dioxide layer on which the DMD superstructure is formed. Holes, or vias, are opened in the oxide layer to allow electrical connection of the DMD superstructure with the electronic circuitry formed in the substrate 104.

The first layer of the superstructure is a metalization layer, typically the third metalization layer and therefore often called M3. The first two metalization layers are typically required to interconnect the circuitry fabricated on the substrate. The third metalization layer is deposited on the insulating layer and patterned to form address electrodes 110 and a mirror bias connection 112. Some micromirror designs have landing electrodes, which are separate and distinct structures but are electrically connects to the mirror bias connection 112. Landing electrodes limit the rotation of the mirror 102 and prevent the rotated mirror 102 or hinge yoke 114 from touching the address electrodes 110, which have a voltage potential relative to the mirror 102. If the mirror 102 contacts the address electrodes 110, the resulting short circuit could fuse the torsion hinges 116 or weld the mirror 102 to the address electrodes 110, in either case ruining the DMD.

Since the same voltage is always applied both to the landing electrodes and the mirrors 102, the mirror bias connection and the landing electrodes are preferably combined in a single structure when possible. The landing electrodes are combined with the mirror bias connection 112 by including regions on the mirror bias/reset connection 112, called landing sites, which mechanically limit the rotation of the mirror 102 by contacting either the mirror 102 or the torsion hinge yoke 114. These landing sites are often coated with a material chosen to reduce the tendency of the mirror 102 and torsion hinge yoke 114 to stick to the landing site.

Mirror bias/reset voltages travel to each mirror 102 through a combination of paths using both the mirror bias/reset metalization 112 and the mirrors and torsion beams of adjacent mirror elements. Split reset designs require the array of mirrors to be subdivided into multiple subarrays each having an independent mirror bias connection. The landing electrode/mirror bias 112 configuration shown in FIG. 1 is ideally suited to split reset applications since the DMD elements are easily segregated into electrically isolated rows or columns simply by isolating the mirror bias/reset layer between the subarrays. The mirror bias/reset layer of FIG. 1 is shown divided into rows of isolated elements.

A first layer of supports, typically called spacervias, is fabricated on the metal layer forming the address electrodes 110 and mirror bias connections 112. These spacervias, which include both hinge support spacervias 116 and upper address electrode spacervias 118, are typically formed by spinning a thin spacer layer over the address electrodes 110 and mirror bias connections 112. This thin spacer layer is typically a 1 µm thick layer of positive photoresist. After the photoresist layer is deposited, it is exposed, patterned, and deep UV hardened to form holes in which the spacervias will be formed. This spacer layer and a thicker spacer layer used later in the fabrication process are often called sacrificial layers since they are used only as forms during the fabrication process and are removed from the device prior to device operation.

A thin layer of metal is sputtered onto the spacer layer and into the holes. An oxide is then deposited over the thin metal layer and patterned to form an etch mask over the regions that later will form hinges 120. A thicker layer of metal, typically an aluminum alloy, is sputtered over the thin layer and oxide etch masks. Another layer of oxide is deposited and patterned to define the hinge yoke 114, hinge cap 122, and the upper address electrodes 124. After this second oxide layer is patterned, the two metals layers are etched simultaneously and the oxide etch stops removed to leave thick rigid hinge yokes 114, hinge caps 122, and upper address electrodes 124, and thin flexible torsion beams 120.

A thick spacer layer is then deposited over the thick metal layer and patterned to define holes in which mirror support spacervias 126 will be formed. The thick spacer layer is typically a 2 µm thick layer of positive photoresist. A layer of mirror metal, typically an aluminum alloy, is sputtered on the surface of the thick spacer layer and into the holes in the thick spacer layer. This metal layer is then patterned to form the mirrors 102 and both spacer layers are removed using a plasma etch.

Once the two spacer layers have been removed, the mirror is free to rotate about the axis formed by the torsion hinge. Electrostatic attraction between an address electrode 110 and a deflectable rigid member, which in effect form the two plates of an air gap capacitor, is used to rotate the mirror structure. Depending on the design of the micromirror device, the deflectable rigid member is the torsion beam yoke 114, the beam or mirror 102, a beam attached directly to the torsion hinges, or a combination thereof. The upper address electrodes 124 also electrostatically attract the deflectable rigid member.

The force created by the voltage potential is a function of the reciprocal of the distance between the two plates. As the rigid member rotates due to the electrostatic torque, the torsion beam hinges resist deformation with a restoring torque which is an approximately linear function of the angular deflection of the torsion beams. The structure rotates until the restoring torsion beam torque equals the electrostatic torque or until the rotation is mechanically blocked by contact between the rotating structure and a fixed component. As discussed below, most micromirror devices are operated in a digital mode wherein sufficiently large bias voltages are used to ensure full deflection of the micromirror superstructure.

Micromirror devices are generally operated in one of two modes of operation. The first mode of operation is an analog mode, sometimes called beam steering, wherein the address electrode is charged to a voltage corresponding to the desired deflection of the mirror. Light striking the micromirror device is reflected by the mirror at an angle determined by the deflection of the mirror. Depending on the voltage applied to the address electrode, the cone of light reflected by an individual mirror is directed to fall outside the aperture of a projection lens, partially within the aperture, or completely within the aperture of the lens. The reflected light is focused by the lens onto an image plane, with each individual mirror corresponding to a fixed location on the image plane. As the cone of reflected light is moved from completely within the aperture to completely outside the aperture, the image location corresponding to the mirror dims, creating continuous brightness levels.

The second mode of operation is a digital mode. When operated digitally, each micromirror is fully deflected in either of the two directions about the torsion beam axis. Digital operation uses a relatively large voltage to ensure the mirror is fully deflected. Since it is advantageous to drive the address electrode using standard logic voltage levels, a bias voltage, typically a negative voltage, is applied to the mirror metal layer to increase the voltage difference between the address electrodes and the mirrors. Use of a sufficiently large mirror bias voltage—a voltage above what is termed the collapse voltage of the device—ensures the mirror will deflect to the closest landing electrodes even in the absence of an address voltage. Therefore, by using a large mirror bias voltage, the address voltages need only be large enough to deflect the mirror slightly.

To create an image using the micromirror device, the light source is positioned at an angle equal to twice the angle of rotation so that mirrors rotated toward the light source reflect light in a direction normal to the surface of the micromirror device and into the aperture of a projection lens—creating a bright pixel on the image plane. Mirrors rotated away from the light source reflect light away from the projection lens—leaving the corresponding pixel dark. Intermediate brightness levels are created by pulse width modulation techniques in which the mirror is rapidly and repetitively rotated on and off. The duty cycle of the mirror determines the quantity of light reaching the image plane. The human eye integrates the light pulses and the brain perceives a flicker-free intermediate brightness level.

Full-color images are generated by using three micromirror devices to produce three single-color images, or by sequentially forming three single-color images using a single micromirror device illuminated by a beam of light passing through three color filters mounted on a rotating color wheel.

Figure 3:
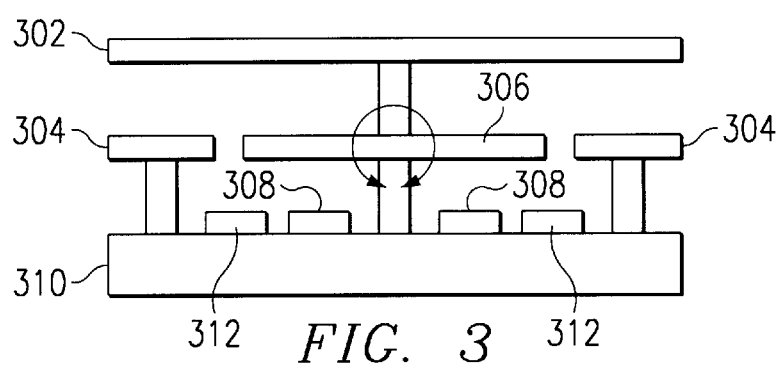
FIG. 3 is a side view of a typical hidden hinge micromirror device in a neutral position.

FIG. 3 is a side view of a typical hidden hinge micromirror device showing the constant clearance between the mirror 302 and the upper address electrodes 304, and between the active hinge yoke 306 and the address electrodes 308 on the substrate 310. As described above, the address electrode 308 and the active hinge yoke 306, and the upper address electrodes 304 and the mirror 302 each form two plates of an air capacitor. Applying bias voltage to the upper and lower address electrodes on one side of the torsion hinge relative to the mirror and hinge yoke creates an electrostatic attractive force that causes the active hinge yoke and mirror to rotate about the hinge axis toward the address electrodes.

Figure 4:
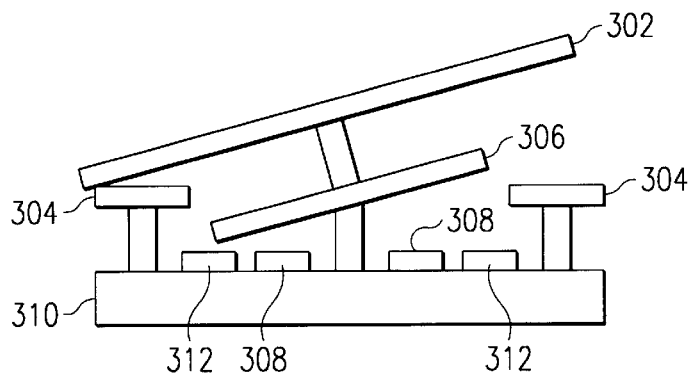
FIG. 4 is a side view of the hidden hinge micromirror device of FIG. 3 in a deflected position.

The electrostatic force is a function of the reciprocal of the distance between the biased members. Therefore, a much stronger force can be created at a given voltage level by reducing the gap between the mirror 302 and the upper address electrodes 304 and the gap between the hinge yoke 306 and the lower address electrodes 308. Unfortunately, reducing the gap greatly limits the angle of deflection of the micromirror device. The angle of deflection, which it typically around 10°, controls the angle of separation between an incident and reflected light beam and has a major impact on the contrast ratio of an image created by the micromirror. Therefore, it is undesirable to reduce the separation between the mirror and upper address electrode or between the hinge yoke and the lower address electrode. FIG. 4 shows the micromirror cell of FIG. 3 in a deflected position.

The solution described herein is to a beveled address electrode 502 or other member to decrease the gap in one region without reducing the range of motion of the deflectable element. While a beveled lower address electrode 502 is shown in FIGS. 5 and 6, it should be understood that the upper address electrode or the underside of the mirror or hinge yoke could also be beveled.

Figure 5:
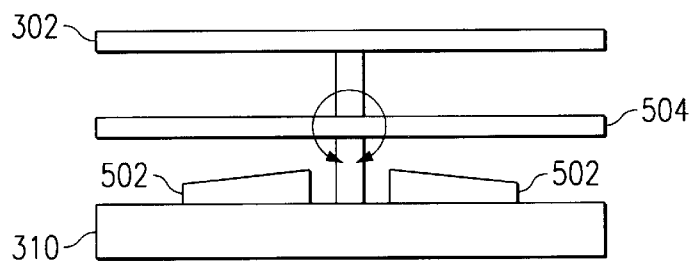
FIG. 5 is a side view of a spring ring hidden hinge micromirror device with beveled address electrodes in a neutral position.
Figure 6:
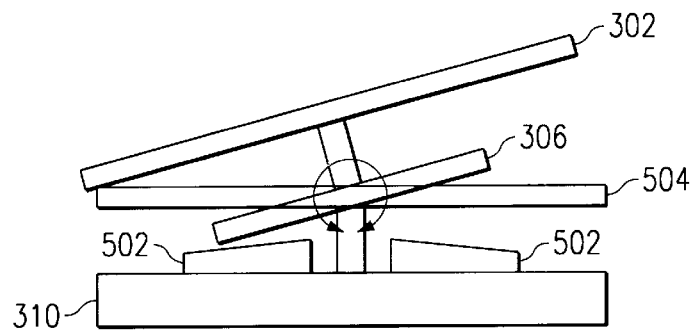
FIG. 6 is a side view of the spring ring hidden hinge micromirror device of FIG. 5 in a deflected position.

The micromirror of FIG. 5 is a spring ring micromirror. Spring ring micromirrors have a ring-shaped spring extending around the hinge yoke. FIG. 6 shows the spring ring micromirror of FIG. 5 in a deflected position. As the hinge yoke and mirror deflect, the mirror 302 contacts the spring ring 504 which arrests the motion of the mirror 302. As seen in FIG. 6, the beveled lower address electrode results in a smaller gap between the active hinge yoke and the beveled address electrode without limiting the motion of the hinge yoke.

Figure 7:
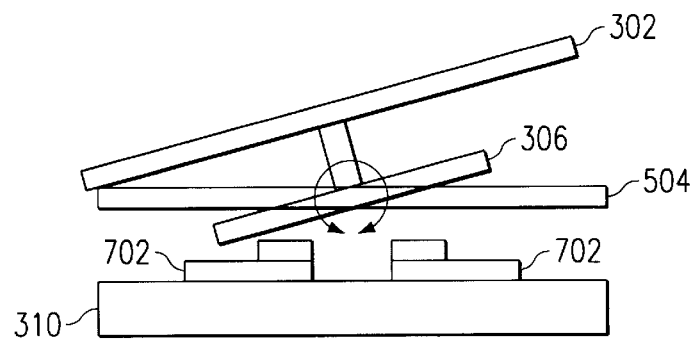
FIG. 7 is a side view of a spring ring hidden hinge micromirror device with stepped address electrodes in a deflected position.

Beveled structures are very difficult to fabricate using standard micromechanical fabrication techniques. A suitable substitute for a beveled structure is a multi-layered structure having one or more stair step structures that provide the effect of the beveled structure without the fabrication difficulties. FIG. 7 shows a lower address electrode that has a two-layered address electrode 702 providing a single stair step. The stair step feature shown in FIG. 7 is easily fabricated by patterning an extra layer of metal deposited on the lower address electrode metal layer. Alternate methods fill a recess in either the first or second spacer layers with metal such that a stair step structure is formed on the underside of the mirror or hinge yoke.

Figure 8:
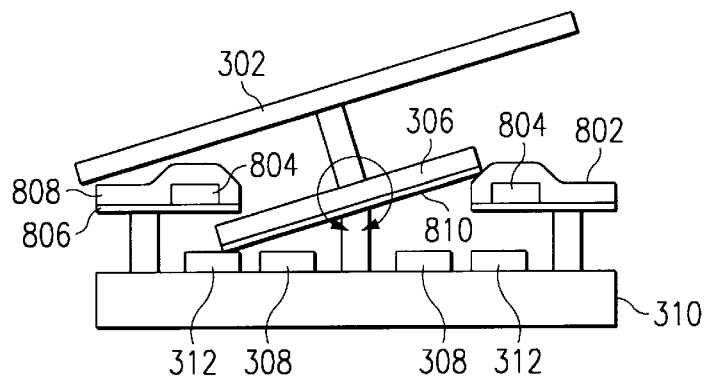
FIG. 8 is a side view of a hidden hinge micromirror device with stepped upper address electrodes in a deflected position.

FIG. 8 illustrates a stair step structure fabricated on the upper address electrodes 802 that does not require any additional steps to fabricate. The stair stepped upper address electrode 802 shown in FIG. 8 uses a portion of the hinge etch stop oxide layer 804 to form the raised portion of the upper address electrode 802. As described above, the hinges of a micromirror are formed during a buried hinge process. The buried hinge process deposits a thin metal layer 806 that will be used to form the torsion hinges. An oxide layer is deposited over the thin metal layer and patterned so that it is removed everywhere except where the hinges will be located—and according to this disclosure, where the stair step in the upper address electrodes will be.

A thick metal layer 808 is then sputtered over the thin metal layer 806 and the remaining portions of the oxide layer. A photoresist layer or a second oxide layer is patterned to protect the metal that will form the upper address electrodes and the hinge yoke, and the unprotected areas of both the thick and thin metal layers are removed in a single etch step. Both layers of metal remain in regions protected by the photoresist or second oxide layer, while only the thin metal layer remains where it was protected by the oxide hinge etch stop.

Regardless of the fabrication technique used, the size and location of the raised portions can be adjusted to maximize the electrostatic benefit provided by the raised structure without limiting the range of motion of the device.

Figure 9:
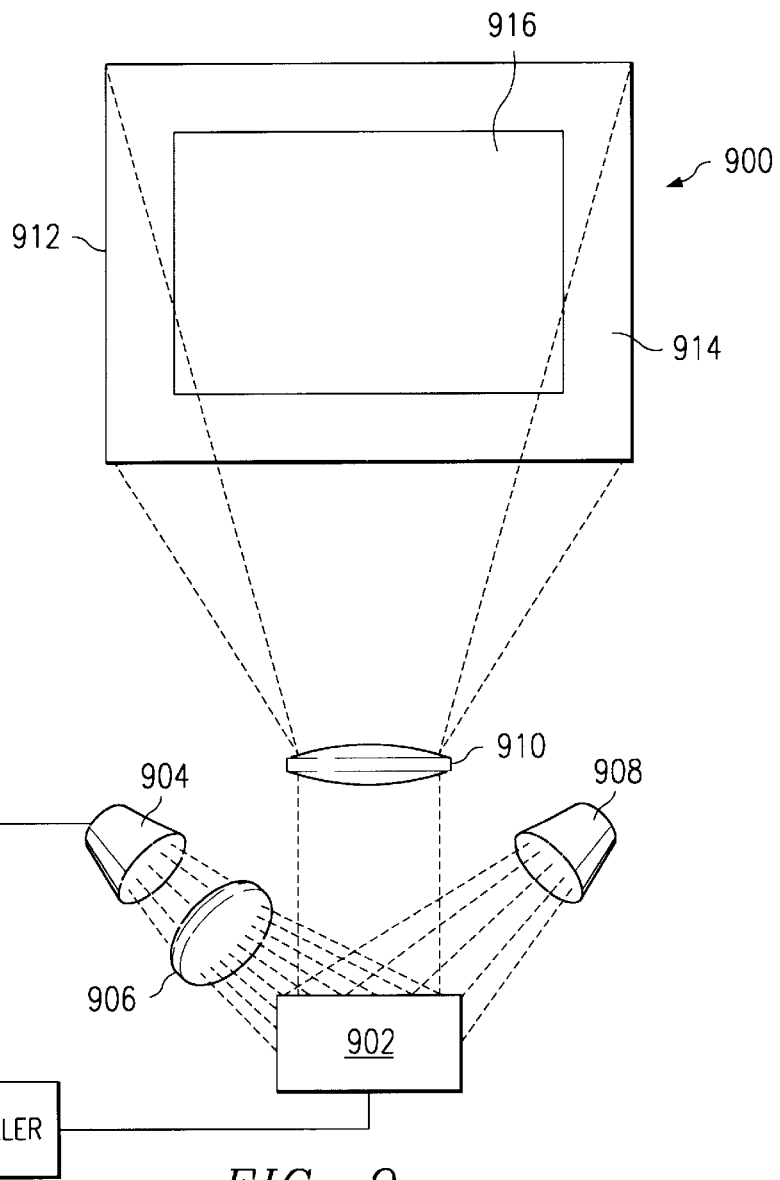
FIG. 9 is a schematic view of a micromirror-based projection system using an improved micromirror device according to one embodiment of the present invention.

FIG. 9 is a schematic view of an image projection system 900 using an improved micromirror 902 according to the present invention. In FIG. 9, light from light source 904 is focused on the improved micromirror 902 by lens 906. Although shown as a single lens, lens 906 is typically a group of lenses and mirrors which together focus and direct light from the light source 904 onto the surface of the micromirror device 902. Image data and control signals from controller 914 cause some mirrors to rotate to an on position and others to rotate to an off position. Mirrors on the micromirror device that are rotated to an off position reflect light to a light trap 908 while mirrors rotated to an on position reflect light to projection lens 910, which is shown as a single lens for simplicity. Projection lens 910 focuses the light modulated by the micromirror device 902 onto an image plane or screen 912.

Thus, although there has been disclosed to this point a particular embodiment for improved electrostatic efficiency of a micromechanical device, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A micromechanical device having improved electrostatic efficiency, said device comprising:
    a first member forming one half of an air-gap capacitor; and
    a second member forming one half of an air gap capacitor, said second member spaced apart from said first member by an air gap, said first member operable to deflect between an undeflected position and at least one deflected position, said second member having a beveled surface such that said air gap is smaller in a first region than in a second region when said second member is in said undeflected sate.

2. A micromirror device comprising:
    a substrate;
    an address electrode supported by said substrate said address electrode having a beveled surface;
    a deflectable member supported by said substrate and spaced apart from said address electrode by a gap, said deflectable member operable to rotate around a hinge axis between an undeflected position and at least one deflected position, said address electrode and said deflectable member such that when said deflectable member is in said undeflected position said gap is narrower over a first region and wider over a second region farther from said hinge axis than said first region.

3. The micromirror device of claim 2, wherein said address electrode is an upper address electrode.

4. The micromirror device of claim 2, wherein said address electrode is a lower address electrode.

5. A micromirror device comprising:

a substrate;

an address electrode supported by said substrate said address electrode having a stair stepped surface;

a deflectable member supported by said substrate and spaced apart from said address electrode by a gap, said deflectable member operable to rotate around a hinge axis between an undeflected position and at least one deflected position, said address electrode and said deflectable member such that when said deflectable member is in said undeflected position said gap is narrower over a first region and wider over a second region farther from said hinge axis than said first region.

6. The micromirror device of claim 5, said stair stepped surface formed by encapsulating an oxide layer between two metal layers.

7. The micromirror device of claim 5, wherein said address electrode is an upper address electrode.

8. The micromirror device of claim 5, wherein said address electrode is a lower address electrode.

9. An image projection system comprising:

a light source for providing a beam of light along a first path;

micromirror device on said first path, said micromirror device comprising:

a substrate;

an address electrode supported by said substrate;

a deflectable member supported by said substrate and spaced apart from said address electrode by a gap, said deflectable member operable to rotate around a hinge axis between an undeflected position and at least one deflected position;

said address electrode having a beveled surface to form a narrow first region of said gap and a wider second region of said gap farther from said hinge axis than said first region when said deflectable member is in said deflectable position; and a controller for providing image data to said micromirror device, said image data directing said micromirror device to rotate said deflectable member to either a first position wherein light incident said deflectable member is directed along a second path to an image plane, or to rotate said deflectable member to a second position wherein light incident said deflectable member is directed along a third path away from said image plane.

10. The image projection system of claim 9, wherein said address electrode is an upper address electrode.

11. The image projection system of claim 9, wherein said address electrode is a lower address electrode.

12. An image projection system comprising:

a light source for providing a beam of light along a first path;

micromirror device on said first path, said micromirror device comprising:

a substrate;

an address electrode supported by said substrate;

a deflectable member supported by said substrate and spaced apart from said address electrode by a gap, said deflectable member operable to rotate around a hinge axis between an undeflected position and at least one deflected position;

said address electrode having a stair stepped surface to form a narrow first region of said gap and a wider second region of said gap farther from said hinge axis than said first region when said deflectable member is in said undeflected position; and a controller for providing image data to said micromirror device, said image data directing said micromirror device to rotate said deflectable member to either a first position wherein light incident said deflectable member is directed along a second path to an image plane, or to rotate said deflectable member to a second position wherein light incident said deflectable member is directed along a third path away from said image plane.

13. The micromirror device of claim 12, said stair stepped surface formed by encapsulating an oxide layer between two metal layers.

14. The image projection system of claim 12, wherein said address electrode is an upper address electrode.

15. The image projection system of claim 12, wherein said address electrode is a lower address electrode.

16. A micromechanical device having improved electrostatic efficiency, said device comprising:

a first member forming one half of an air-gap capacitor; and a second member forming one half of an air gap capacitor, said second member spaced apart from said first member by an air gap, said first member operable to deflect between an undeflected position and at least one deflected position, said second member having a stair stepped surface such that said air gap is smaller in a first region than in a second region when said second member is in said undeflected state.

17. The micromechanical device of claim 16, said stair stepped surface of said second member formed by encapsulating an oxide layer.

\* \* \* \* \*